Sept. 18, 1928.
A. J. HAYDEN
HOE WEEDER
Filed Aug. 29, 1927
1,684,444
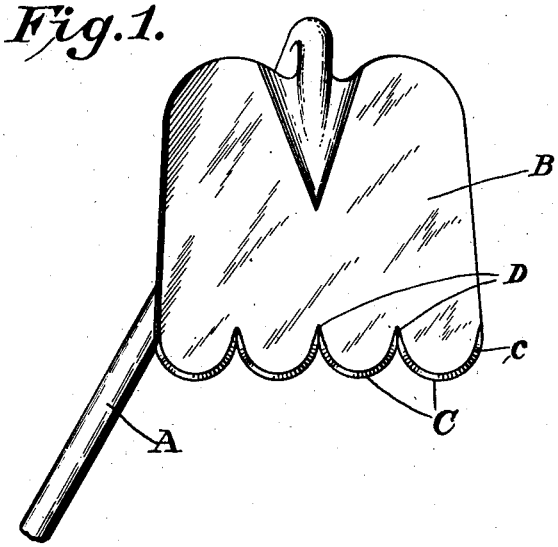
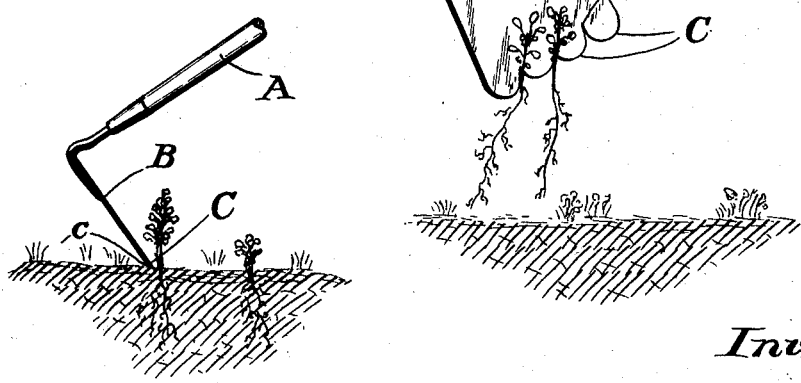
Inventor:
Alfred John Hayden,
by Spear, Middleton, Donaldson & Hall
Attys.

Patented Sept. 18, 1928.

1,684,444

UNITED STATES PATENT OFFICE.

ALFRED J. HAYDEN, OF DAYTONA BEACH, FLORIDA.

HOE WEEDER.

Application filed August 29, 1927. Serial No. 216,237.

My present invention relates to improvements in an agricultural tool such as is ordinarily used in field and garden work, the purpose of which is for extirpating weeds. The object of the invention is to provide a hoe of simple, durable construction, to be used for efficiently hoeing or plucking weeds up by the roots, instead of cutting them off or tearing them partly up, as is done by the use of many other kinds of hoes in common use, and also which will readily cut clods when pulverizing the earth in field work or in making garden beds.

To this end my invention consists in constructing the hoe blade of one piece of metal, with a plurality of wide half-circle or half moon shaped portions on its lower edge, about one-seventh of the height or depth of the blade, the under side of which are bevelled to a sharp edge as is required, and which can be easily kept sharp and in true shape by the use of a three cornered file.

My invention consists in providing the wide half circle portions, the edges of which are bevelled on their under side, and also the particular designed interspaces between the said half-circles, where they come to somewhat of a V-shape, forming an escalloped lower edge for the hoe weeder, whereby when in operation the sharp edges firmly grip the top or large part of the roots of weeds or clusters of grass as the case may be, near the top surface of the ground, and by moving the hoe forward and upward they are easily pulled or plucked out by the roots clean from the ground, and are deposited loosely upon the ground so they may dry out and become dead, thereby not cutting the roots off and leaving many of them in the ground to grow again, as is the case by the use of the common hoes now used.

My device is adapted by the tapered converging gripping spaces between the scalloped-shaped teeth of the escalloped edge to grip weed roots as small as a pencil point, and to remove the weed, root and all.

The invention is illustrated in the accompanying drawings, in which

Figure 1 is a perspective view.
Fig. 2 is a detail view.
Fig. 3 is a plan view.

Referring by reference characters to this drawing, the letter (A) designates the handle which is provided with a suitable hoe blade (B). (C) designates the contiguous wide half-circle portions of scallop-shaped teeth, the escalloped lower edge of the hoe blade, the under side of which teeth or half-circle portions are bevelled to a sharp edge (c) which is sharp enough to cut weeds if desired, and for chopping the roots off if desired instead of gripping them and pulling them up. (D) designates the particular designed interspaces between the said contiguous half-circle portions, which are somewhat of a V-shape, but in which the arms of the V curve inwardly toward the apex thereof, which spaces are for the purpose of pinching or gripping the top or large part of the roots of weeds or clusters of grass near the top surface of the ground, and by a slight forward and upward movement of the hoe to pull them out by the roots.

The depth of the teeth is about one-seventh of the depth of the blade.

I claim:

An improved hoe with a handle and a one piece hoe blade said blade having a series of relatively wide half-circle portions substantially at right angles to said handle on the lower edge, the side of said portions opposite to the side on which the handle is located being beveled to provide a sharp edge and with the side facing the handle plain, the spaces between said half-circle portions curving inwardly and upwardly to an apex point for gripping roots of weeds and the like, the depth of said half circle portions being such that the true character of the hoe, as such, is retained.

In testimony whereof, I affix my signature.

ALFRED J. HAYDEN.